(12) United States Patent
Lyons et al.

(10) Patent No.: US 9,953,446 B2
(45) Date of Patent: Apr. 24, 2018

(54) METHOD AND SYSTEM FOR PRESENTING INFORMATION VIA A USER INTERFACE

(71) Applicant: SONY CORPORATION, Tokyo (JP)

(72) Inventors: Gary Lyons, San Diego, CA (US); David Young, San Diego, CA (US); Jenny Fredriksson, San Diego, CA (US); Priyan Gunatilake, San Diego, CA (US); Eric Hsiao, San Diego, CA (US); Sriram Sampathkumaran, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 122 days.

(21) Appl. No.: 14/582,487

(22) Filed: Dec. 24, 2014

(65) Prior Publication Data

US 2016/0189405 A1      Jun. 30, 2016

(51) Int. Cl.
| | |
|---|---|
| *G06T 11/60* | (2006.01) |
| *G06F 3/01* | (2006.01) |
| *G06T 11/00* | (2006.01) |
| *G06T 19/00* | (2011.01) |
| *H04M 1/725* | (2006.01) |

(Continued)

(52) U.S. Cl.
CPC ............ *G06T 11/60* (2013.01); *G06F 1/1626* (2013.01); *G06F 1/1686* (2013.01); *G06F 3/011* (2013.01); *G06F 3/017* (2013.01); *G06F 3/0304* (2013.01); *G06T 11/001* (2013.01); *G06T 19/006* (2013.01); *H04M 1/72519* (2013.01); *G06F 2203/04804* (2013.01)

(58) Field of Classification Search
CPC ............... G09G 2340/10; G09G 5/377; G09G 2340/12; G06F 2200/1637; H04N 2007/145; G06T 11/206; G06T 11/60; G06T 15/503; G06T 2200/24; G06T 2219/004; G06T 2210/62

See application file for complete search history.

(56) References Cited

U.S. PATENT DOCUMENTS

| | | | | |
|---|---|---|---|---|
| 4,395,740 A | * | 7/1983 | Yuen | G09B 5/065 360/134 |
| 8,400,548 B2 | | 3/2013 | Bilbrey et al. | |
| 8,405,871 B2 | | 3/2013 | Smith et al. | |

(Continued)

FOREIGN PATENT DOCUMENTS

WO      2014/126283 A      8/2014

OTHER PUBLICATIONS

Xi Chen, et al., "Image Based Information Access for Mobile Phones", Published in Content-Based Multimedia Indexing (CBMI), 2010 International Workshop, IEEE, Jun. 2010, pp. 1-5, "http://  ieeexplore.ieee.org/xpl/articleDetails.jsp?reload=true&arnumber=5529886".

(Continued)

*Primary Examiner* — Haixia Du
(74) *Attorney, Agent, or Firm* — Chip Law Group

(57) ABSTRACT

Various aspects of a method and system to present information via a user interface are disclosed herein. In accordance with an embodiment, the method includes detection of an orientation of an electronic device. The electronic device overlays one or more layers of information on the user interface displayed at the electronic device. Transparency of the overlaid one or more layers of information is dynamically adjusted based on the detected orientation of the electronic device.

17 Claims, 6 Drawing Sheets

(51) Int. Cl.
*G06F 1/16* (2006.01)
*G06F 3/03* (2006.01)

(56) References Cited

U.S. PATENT DOCUMENTS

| | | |
|---|---|---|
| 8,498,484 B2 | 7/2013 | Boncyk et al. |
| 2008/0268876 A1 | 10/2008 | Gelfand et al. |
| 2009/0027418 A1* | 1/2009 | Maru ............... G06F 17/30241 345/629 |
| 2011/0105152 A1* | 5/2011 | Yu ......................... H04W 4/02 455/456.3 |
| 2012/0268391 A1 | 10/2012 | Somers |
| 2012/0007885 A1 | 12/2012 | Huston |
| 2012/0328196 A1* | 12/2012 | Kasahara ............... G06T 15/20 382/190 |
| 2013/0229330 A1* | 9/2013 | Elyada .................... G09G 5/00 345/156 |
| 2013/0311947 A1* | 11/2013 | Tsai ................... G06F 3/04842 715/815 |

OTHER PUBLICATIONS

Google Inc., "Google Goggles", May 28, 2014, p. 1-3, "https://play.google.com/store/apps/details?id=com. google.android.apps.unveil &hl=en".
Cable News Network, "Top 10 Augmented Reality Travel Apps", Mar. 7, 2011, p. 1-5, "http://travel.cnn.com/explorations/life/top-10-augmented-reality-travel-apps-569570".
"Here City Lens", 2013, "http://www.nokia.com/in-en/support/product/here-city-lens-wp8/".
European Extended Search Report recieved for European Patent Application No. 15200153.3, dated May 17, 2016, p. 7.

* cited by examiner

METHOD AND SYSTEM FOR PRESENTING INFORMATION VIA A USER INTERFACE

FIELD

Various embodiments of the disclosure relate to presenting information. More specifically, various embodiments of the disclosure relate to presenting information via a user interface.

BACKGROUND

Advancements in the field of digital technology have extended the functionalities of various electronic devices and associated applications. Electronic devices, such as a smartphone, are widely used as information resources. For example, a user may capture a view of a real-world object by a smartphone and subsequently, receive augmented-reality (AR) information about the object present in the captured view.

In certain scenarios, it may be tiresome to hold the smartphone in the "on" position continuously to receive AR information and not to have the ability to use the information at a later time. Further, the AR information generated about the objects may be inadequate and cluttered. It may be difficult for the electronic device to process captured image data to present the AR information in an easy-to-understand format. Consequently, an enhanced and usable viewing experience may not be provided to the user.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A method and a system to present information via a user interface substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
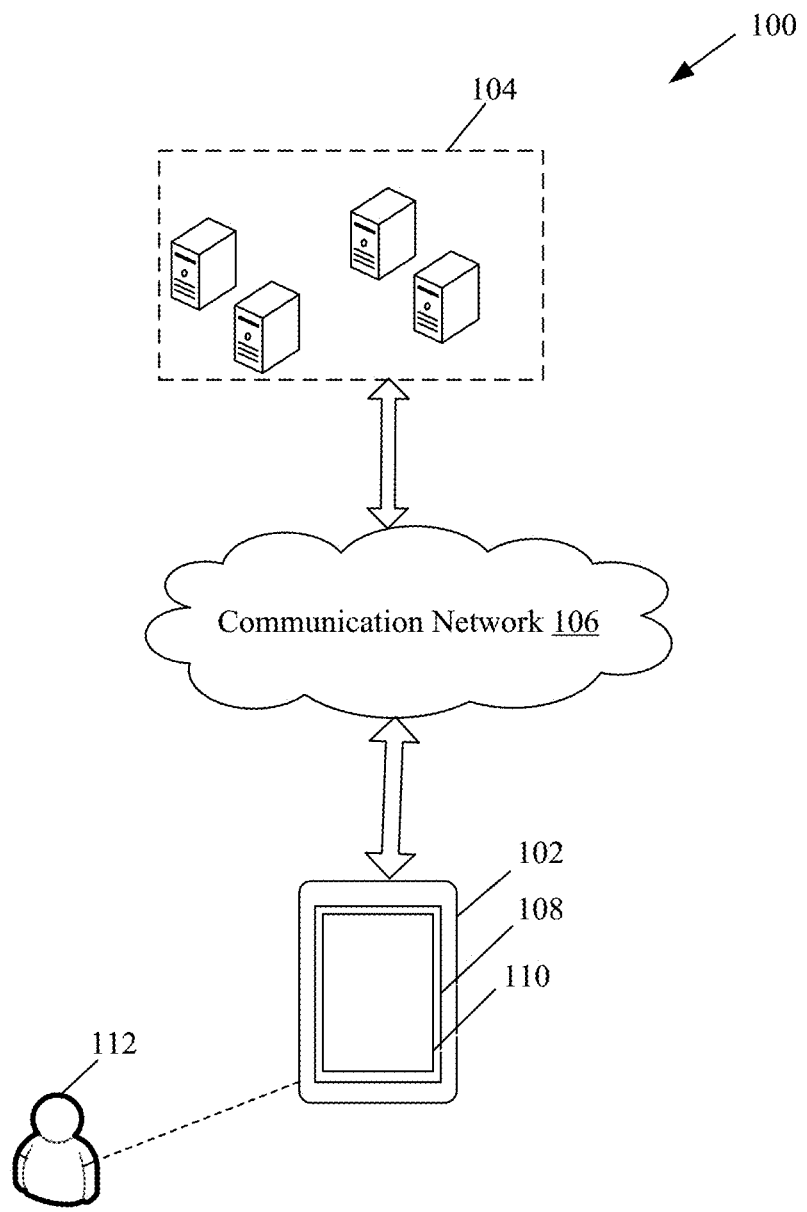
FIG. 1 is a block diagram that illustrates a network environment, in accordance with an embodiment of the disclosure.

The following described implementations may be found in a disclosed method and system that presents information via a user interface (UI). Exemplary aspects of the disclosure may comprise a method that may detect an orientation of the electronic device that overlays one or more layers of information on a user interface (UI). The UI may be displayed at the electronic device. Transparency of the overlaid one or more layers of information may be dynamically adjusted based on the detected orientation of the electronic device.

In accordance with an embodiment, one or more objects in a first view captured by the electronic device may be identified. The one or more layers of information may correspond to first information related to the identified one or more objects in the first view. The one or more layers of information may further correspond to second information related to other objects associated with the identified one or more objects. The other objects may not be visible in the first view.

In accordance with an embodiment, the overlaid one or more layers of information may be dynamically updated when a second view is captured by the electronic device. The one or more layers of information may be determined based on one or more functional services. The one or more functional services may correspond to a map service, an internet search service, a geospatial positioning service, a social network, an address book service, a domain-specific database service, a user profile information, and/or a sensor-based service.

In accordance with an embodiment, a composite view may be dynamically generated. The composite view may comprise the overlaid one or more layers of information with dynamically adjusted transparency of each of the one or more layers of information. The dynamically generated composite view may be displayed at the UI of the electronic device. The one or more layers of information in the displayed composite view may be synchronized with respect to each other.

In accordance with an embodiment, the UI of the displayed composite view may be dynamically switched from a first mode to a second mode. The first mode and the second mode may correspond to an augmented reality (AR) view mode, a character recognition mode, a barcode recognition mode, and/or detailed information display mode. The dynamic switching of the UI from the first mode to the second mode may be based on one of a detection of another orientation of the electronic device and a user input received via the UI.

In accordance with an embodiment, the one or more layers of information may be determined based on the dynamic switching of the UI from the first mode to the second mode. The displayed composite view may be modified based on the determined metadata of the one or more layers of information.

In accordance with an embodiment, the one or more layers of information may comprise a map view layer, an information label layer, a light beam layer, a field-of-view layer, and/or a pre-recorded media content layer. The light beam layer may comprise one or more light beams that may selectively highlight one or more locations displayed at the map view layer. In accordance with an embodiment, media content from the media content layer displayed at a display screen of the electronic device may be selectively shared with another electronic device. Such selective sharing may occur when the display screen is synchronized with another display screen of the other electronic device. In accordance with an embodiment, the overlaid one or more layers of information may be arranged at an angle with respect to a reference axis. The arrangement may be based on the detected orientation of the electronic device.

FIG. 1 is a block diagram that illustrates a network environment, in accordance with an embodiment of the disclosure. With reference to FIG. 1, there is shown a network environment 100. The network environment 100 may include an electronic device 102, a plurality of cloud-based resources 104, a communication network 106, a display screen 108, a UI 110, and one or more users, such as a user 112.

The electronic device 102 may be communicatively coupled with the plurality of cloud-based resources 104, via the communication network 106. The electronic device 102 may include the display screen 108 that may display the UI 110. The electronic device 102 may be associated with the user 112.

The electronic device 102 may comprise suitable logic, circuitry, interfaces, and/or code that may be operable to dynamically adjust transparency of overlaid one or more layers of information. The electronic device 102 may dynamically adjust the transparency of the overlaid one or more layers of information based on detection of orientation information. Examples of the electronic device 102 may include, but are not limited to, a smartphone, a camera, a tablet computer, a laptop, a wearable electronic device, a television, an Internet Protocol Television (IPTV), and/or a Personal Digital Assistant (PDA) device.

The plurality of cloud-based resources 104 may comprise one or more servers that may provide one or more functional services and/or related data to one or more subscribed electronic devices, such as the electronic device 102. The plurality of cloud-based resources 104 may be implemented by use of several technologies that are well known to those skilled in the art. The one or more servers from the plurality of cloud-based resources 104 may be associated with a single or multiple service providers. Examples of the one or more servers may include, but are not limited to, Apache™ HTTP Server, Microsoft® Internet Information Services (IIS), IBM® Application Server, Sun Java™ System Web Server, and/or a file server.

The communication network 106 may include a medium through which the electronic device 102 may communicate with one or more servers, such as the plurality of cloud-based resources 104. Examples of the communication network 106 may include, but are not limited to, the Internet, a cloud network, a Wireless Fidelity (Wi-Fi) network, a Wireless Local Area Network (WLAN), a Local Area Network (LAN), a plain old telephone service (POTS), and/or a Metropolitan Area Network (MAN). Various devices in the network environment 100 may be operable to connect to the communication network 106, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

The display screen 108 may comprise suitable logic, circuitry, interfaces, and/or code that may be operable to display the UI 110. The display screen 108 may be further operable to render one or more features and/or applications of the electronic device 102. The display screen 108 may be realized through several known technologies, such as, but not limited to, Liquid Crystal Display (LCD) display, Light Emitting Diode (LED) display, and/or Organic LED (OLED) display technology.

The UI 110 may correspond to a visual interface that may facilitate the user 112 to interact with one or more applications and/or operating systems of the electronic device 102. The UI 110 may be rendered on the display screen 108. The UI 110 may be operable to display a composite view of the overlaid one or more layers of information with dynamically adjusted transparencies of each layer of information. In accordance with an embodiment, the UI 110 may be operable to present a software button on the display screen 108 to receive a user input from the user 112. Based on the received user input, a mode of the UI 110 may be dynamically switched from a first mode to a second mode. In accordance with an embodiment, the UI 110 may be a graphical user interface (GUI) that may include graphical controls, such as a menu bar, a toolbar, a window, a button, and other such controls.

In operation, the electronic device 102 may be operable to capture a first view that may comprise one or more objects. The electronic device 102 may be operable to identify the one or more objects in the captured first view. In accordance with an embodiment, the electronic device 102 may be operable to determine one or more layers of information related to the identified one or more objects in the captured first view. In accordance with an embodiment, the one or more layers of information may correspond to first information related to the identified one or more objects. The electronic device 102 may be operable to determine the one or more layers of information based on one or more functional services. The one or more functional services may correspond to one or more of a map service, an internet search service, a geospatial positioning service, a social network, an address book service, a domain-specific database service, a user profile information, and/or a sensor-based service.

The one or more layers of information may include, but not limited to, a map view layer, an information label layer, a light beam layer, a field-of-view layer, and/or a media content layer. In accordance with an embodiment, the electronic device 102 may be operable to selectively share media content from the media content layer displayed at the display screen 108 with another electronic device (not shown). The media content may be selectively shared when the display screen 108 of the electronic device 102 is synchronized with another display screen (not shown) of the other electronic device. The media content may be selectively shared based on a selection of desired media content provided by the user 112 via the UI 110. The media content may be displayed at the UI 110 in one of the formats, such as a matrix format, known in the art. The media content in the media content layer may be one or more of: a live view captured by an image capturing unit of the electronic device 102 in real-time, pre-stored media content retrieved from local memory, and/or media content received from an external resource (not shown), such as a multimedia server or a television broadcast station.

The electronic device 102 may be further operable to detect an orientation of the electronic device 102. The electronic device 102 may be further operable to overlay the determined one or more layers of information in a sequence. In accordance with an embodiment, the sequence may be determined based on a user input provided by the user 112. In accordance with an embodiment, the sequence may be automatically determined by the electronic device 102 based on previous learning experience.

In accordance with an embodiment, the electronic device 102 may be operable to dynamically adjust the transparency of each of the overlaid one or more layers of information. Such dynamic adjustment of the transparencies of each layer may be based on the detected orientation of the electronic device 102. In accordance with an embodiment, the electronic device 102 may be operable to arrange the overlaid one or more layers of information at an angle with respect to a reference axis. The arrangement may be based on the detected orientation of the electronic device 102. The electronic device 102 may further generate a composite view based on the overlaid one or more layers of information with dynamically adjusted transparency and/or angle of each layer. The electronic device 102 may be operable to display the generated composite view on the UI 110 of the electronic device 102. The overlaid one or more layers of information in the displayed composite view may be synchronized with respect to each other.

In accordance with an embodiment, the electronic device 102 may be operable to dynamically update the overlaid one or more layers of information when a second view is captured by the electronic device 102. The electronic device 102 may be operable to identify other one or more objects in the captured second view. In accordance with an embodiment, the electronic device 102 may be operable to determine the one or more layers of information related to the other one or more objects in the captured second view.

In accordance with an embodiment, the electronic device 102 may be operable to dynamically switch a mode of the UI 110 from a first mode to a second mode. In accordance with an embodiment, the electronic device 102 may be operable to switch a mode of the UI 110 based on a detection of another orientation of the electronic device 102, such as a rotation of the electronic device 102 from a horizontal orientation to a vertical orientation. In accordance with an embodiment, the electronic device 102 may be operable to switch the mode of the UI 110 based on a user input received from the user 112 via the UI 110. The first mode and the second mode may correspond, but are not limited to, an AR view mode, a character recognition mode, a barcode recognition mode, and/or detailed information display mode.

In accordance with an embodiment, the electronic device 102 may be operable to determine metadata of the one or more layers of information based on the dynamically switched mode of the UI 110. The electronic device 102 may be operable to modify the displayed composite view based on the determined metadata of the one or more layers of information. The electronic device 102 may be operable to display the modified composite view.

Figure 2:
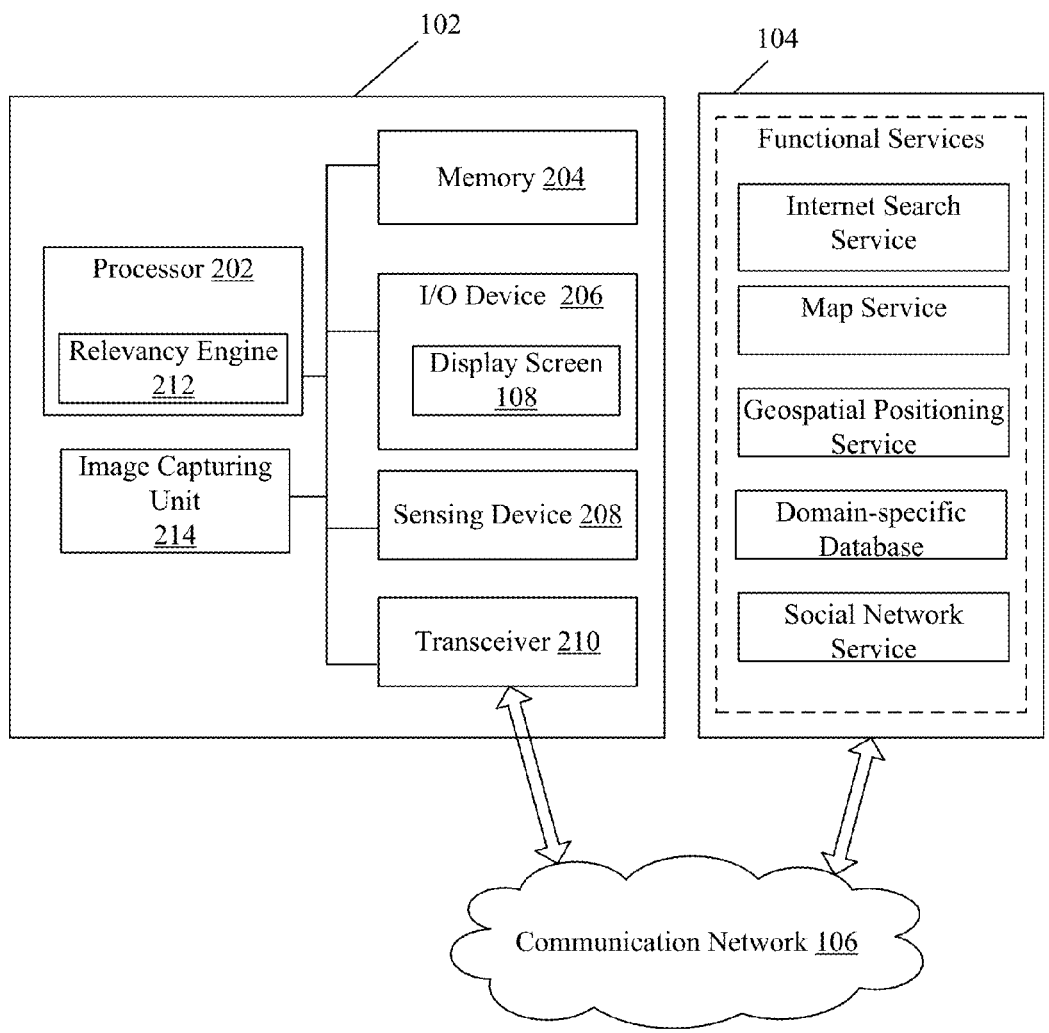
FIG. 2 is a block diagram that illustrates an exemplary electronic device, in accordance with an embodiment of the disclosure.

FIG. 2 is a block diagram that illustrates an exemplary electronic device, in accordance with an embodiment of the disclosure. FIG. 2 is explained in conjunction with elements from FIG. 1. With reference to FIG. 2, there is shown the electronic device 102. The electronic device 102 may comprise one or more processors, such as a processor 202, a memory 204, one or more input/output (I/O) devices, such as an I/O device 206, one or more sensing devices, such as a sensing device 208, and a transceiver 210. The processor 202 may include a relevancy engine 212. The electronic device may further comprise an image capturing unit 214. With reference to FIG. 2, there is further shown the display screen 108, the plurality of cloud-based resources 104, and the communication network 106, as shown in FIG. 1.

The processor 202 may be communicatively coupled to the memory 204, the I/O device 206, the sensing device 208, the transceiver 210, and the image capturing unit 214. The transceiver 210 may be operable to communicate with the one or more servers, such as the plurality of cloud-based resources 104, via the communication network 106.

The processor 202 may comprise suitable logic, circuitry, interfaces, and/or code that may be operable to execute a set of instructions stored in the memory 204. The processor 202 may be operable to dynamically adjust the transparency of the overlaid one or more layers of information based on detection of orientation information provided by the sensing device 208. The processor 202 may be further operable to generate a composite view based on the overlaid one or more layers of information with dynamically adjusted transparency of each layer. The processor 202 may be implemented based on a number of processor technologies known in the art. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

The memory 204 may comprise suitable logic, circuitry, and/or interfaces that may be operable to store a machine code and/or a computer program with at least one code section executable by the processor 202. The memory 204 may be further operable to store one or more user profiles (such as user profile information of the user 112), one or more text-to-speech conversion algorithms, one or more speech generation algorithms, and/or other data. The memory 204 may further be operable to store media content. The media content may be a live view captured via the UI 110 in real-time. The media content may be received from an external resource (not shown), such as a multimedia server or a television broadcast station. The memory 204 may be further operable to store optical character recognition (OCR) algorithms or the programs for barcode scan. The memory 204 may be further operable to store operating systems and associated applications. Examples of implementation of the memory 204 may include, but are not limited to, Random Access Memory (RAM), Read Only Memory (ROM), Hard Disk Drive (HDD), Flash memory, and/or a Secure Digital (SD) card.

The I/O device 206 may comprise suitable logic, circuitry, interfaces, and/or code that may be operable to receive an input from the user 112. The I/O device 206 may be further operable to provide an output to the user 112. The I/O device 206 may comprise various input and output devices that may be operable to communicate with the processor 202. Examples of the input devices may include, but are not limited to, the image capturing unit 214, a camcorder, a touch screen, a keyboard, a mouse, a joystick, a microphone, a motion sensor, a light sensor, and/or a docking station. Examples of the output devices may include, but are not limited to, the display screen 108, a projector screen, and/or a speaker.

The sensing device 208 may comprise suitable logic, circuitry, and/or interfaces that may be operable to store a machine code and/or a computer program with at least one code section executable by the processor 202. The sensing device 208 may comprise one or more sensors for detection of an orientation of the electronic device 102, tap detection, and/or gesture detection. The sensing device 208 may further comprise one or more sensors to aid in capture of one or more views, such as images and/or videos, by the image capturing unit 214. The one or more sensors may further include a microphone to detect a voice pattern, confirm recognition, identification, and/or verification of the user 112. Examples of the one or more sensors may include, but are not limited to, an accelerometer, a global positioning system (GPS) sensor, a compass or magnetometer, an ambient light sensor, a tricorder, a gyroscope, a proximity sensor, an image sensor, a lux meter, a touch sensor, an infrared sensor, and/or other sensors.

The transceiver 210 may comprise suitable logic, circuitry, interfaces, and/or code that may be operable to communicate with one or more servers, such as the plurality of cloud-based resources 104, via the communication network 106 (as shown in FIG. 1). The transceiver 210 may implement known technologies to support wired or wireless communication of the electronic device 102 with the communication network 106. The transceiver 210 may include, but is not limited to, an antenna, a radio frequency (RF) transceiver, one or more amplifiers, a tuner, one or more oscillators, a digital signal processor, a coder-decoder (CO-DEC) chipset, a subscriber identity module (SIM) card, and/or a local buffer.

The transceiver 210 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The relevancy engine 212 may comprise suitable logic, circuitry, interfaces, and/or code that may be operable to filter information that may be presented on the UI 110. The relevancy engine 212 may aid in the determination of information related to objects or events associated with the identified one or more objects. In accordance with an embodiment, the relevancy engine 212 may be a part of the processor 202. In accordance with an embodiment, the relevancy engine 212 may be implemented as a separate processor or circuitry in the electronic device 102. In accordance with an embodiment, the relevancy engine 212 and the processor 202 may be implemented as an integrated processor or a cluster of processors that performs the functions of the relevancy engine 212 and the processor 202.

The image capturing unit 214 may comprise suitable logic, circuitry, interfaces, and/or code that may be operable to capture live views, such as a first view and a consecutive second view, in real-time. The image capturing unit 214 may comprise a viewfinder that may be operable to compose and/or focus the live views captured by the image capturing unit 214. The image capturing unit 214 may be operable to store the capture live views in a local buffer and/or the memory 204.

In operation, the processor 202 may be operable to receive a first view from the image capturing unit 214. The first view may comprise one or more objects, such as a landmark, a point-of-interest (POI), a human face, a book, a wine bottle, and/or other objects. The processor 202 may be operable to identify the one or more objects in the first view captured by the image capturing unit 214. Such identification may be based on a visual search of the image data and/or type of object(s) in the captured first view. For example, the processor 202 may be operable to use the sensing device 208 and one or more functional services, such as the geospatial positioning service, for identification of the landmark(s). In accordance with an embodiment, such identification may be a feature-based and/or pattern-based identification in the captured first view. In such a case, the identification of the landmark(s) and/or other objects may not require use of the geospatial positioning service. The processor 202 may be operable to identify objects, such as a book, based on a scan of the object in the captured first view.

In the above example, the scan of the object in the captured image data may occur in the character recognition mode and/or the barcode recognition mode. In accordance with an embodiment, the processor 202 may be operable to utilize an optical character recognition (OCR) algorithm, or a program for barcode scan to generate searchable written characters or codes. The OCR algorithm or the program for barcode scan may be retrieved from the memory 204. Subsequently, the processor 202 may be operable to search for the generated searchable characters in a domain-specific database, such as a pre-stored literature database, to identify the object, such as the book. The domain-specific database may be one of the plurality of cloud-based resources 104.

In accordance with an embodiment, the processor 202 may be operable to determine one or more layers of information related to the identified one or more objects in the captured first view. In accordance with an embodiment, the one or more layers of information may correspond to first information related to the identified one or more objects. The processor 202 may be further operable to determine one or more layers of information based on historical data of usage pattern of the user 112. The historical data may be accessed from the user profile information that may be stored in the memory 204. The processor 202 may be further operable to determine the one or more layers of information based on one or more functional services. Such determination may be further based on the identified one or more objects. A first set of the one or more functional services may be provided by the plurality of cloud-based resources 104. A second set of the one or more functional services may be implemented at the electronic device 102. The first set of the one or more functional services may include a map service, an internet search service, a geospatial positioning service, a social network, a domain-specific database service, and/or a sensor-based service. The second set of the one or more functional services may include an address book service, a calendar service, and/or the user profile information that may be stored in the memory 204.

The one or more layers of information may include, but not limited to, a map view layer, an information label layer, a light beam layer, a field-of-view layer, and/or a media content layer. The one or more functional services may correspond to a map service, an internet search service, a geospatial positioning service, a social network, an address book service, a domain-specific database service, a user profile information, and/or a sensor-based service. Such functional services may be provided by the plurality of cloud-based resources 104.

In accordance with an embodiment, the processor 202 may be operable to communicate with one or more servers, such as the plurality of cloud-based resources 104, via the transceiver 210. Such communication may occur for the identification and the determination of the one or more layers of information. The processor 202 may be further operable to utilize the relevancy engine 212 to determine and/or filter information, such as first information and second information, related to the first view. The first information may be related to the identified one or more objects in the first view. The second information may be related to other objects (not visible in the first view) associated with the identified one or more objects. The first information and the second information may be filtered for the determined one or more layers of information.

In accordance with an embodiment, the sensing device 208 may be operable to detect an orientation of the electronic device 102. The detected orientation may be communicated to the processor 202. In accordance with an embodiment, the processor 202 may be operable to overlay the determined one or more layers of information in a sequence. In accordance with an embodiment, the sequence may be determined based on a user input provided by the user 112. In accordance with an embodiment, the sequence may be automatically determined by the electronic device 102 based on previous learning experience retrieved from a knowledge base (not shown) in the plurality of cloud-based resources 104. The one or more layers of information may correspond to the first information related to the identified one or more objects in the first view. The one or more layers of information may further correspond to the filtered information, such as first information and second information, determined by the relevancy engine 212.

In accordance with an embodiment, the processor 202 may be operable to dynamically adjust the transparency of each of the overlaid one or more layers of information. Such dynamic adjustment of the transparencies of each layer may be based on the detected orientation of the electronic device 102 received from the sensing device 208. In accordance with an embodiment, the processor 202 may be operable to arrange the overlaid one or more layers of information at an angle with respect to a reference axis. In accordance with an embodiment, the reference axis may be parallel to the display screen 108. The angle may be automatically determined by the processor 202 to provide a seamless viewing experience to the user 112. The arrangement may be based on the detected orientation of the electronic device 102. In an exemplary scenario, there may be three layers of information determined by the processor 202. The three layers of information may comprise a field-of-view layer, a map layer, and a light beam layer. The three layers of information may be overlaid such that the light beam layer is at the topmost layer, the field-of-view layer is the middle layer, and the map layer is the bottommost layer. The initial transparency of each of the three overlaid layers may be zero percent. In such a scenario, when the overlaid three layers are displayed at the UI 110, only the topmost layer (the light beam layer) may be visible to the user 112.

In accordance with the exemplary scenario with reference to the disclosure, the processor 202 may determine the orientation of the electronic device 102 to be a horizontally upright orientation. Based on the orientation, the processor 202 may be operable to dynamically adjust the transparency of each of the three overlaid layers, such that all the three layers may be visible to the user 112 simultaneously. The processor 202 may adjust the transparency of the field-of-view layer to 60-70 percent, the map view layer to 50 percent, and the light beam layer to 50 percent. The processor 202 may further arrange the field-of-view layer and the light beam layer at an angle of zero degrees with respect to the reference axis. The processor 202 may further arrange the map view layer at an angle of 45 degrees with respect to the reference axis. In accordance with another exemplary scenario, the orientation of the electronic device 102 may be changed by an angle, such as 30 degrees, with respect to the horizontally upright orientation. In such a case, the processor 202 may adjust the transparency of the field-of-view to zero percent, the map view layer to 50 percent, and the light beam layer to 70 percent. The processor 202 may align the light beam layer and the map view layer at an angle of 90 degrees with respect to each other. The aligned light beam layer and the map view layer may be further arranged at an angle of zero degrees with respect to the reference axis.

The processor 202 may further generate a composite view based on the overlaid one or more layers of information with dynamically adjusted transparency and/or angle of each layer. The generated composite view may be displayed at the UI 110 rendered on the display screen 108 of the electronic device 102. The overlaid one or more layers of information in the displayed composite view may be synchronized with respect to each other.

The processor 202 may be operable to dynamically update the overlaid one or more layers of information when a second view is captured by the image capturing device 214. For example, one or more new information labels may be determined for the information label layer that may be displayed as one of the overlaid one or more layers of information on UI 110. The overlaid one or more layers of information may be updated for the captured second view based on the one or more functional services. The processor 202 may be further operable to dynamically adjust the transparency of each of the dynamically updated one or more layers of information. The processor 202 may be further operable to update the composite view based on the dynamically adjusted transparency and/or angle of each of the dynamically updated one or more layers of information. The electronic device 102 may be operable to identify other one or more objects in the captured second view. In accordance with an embodiment, the electronic device 102 may be operable to determine the one or more layers of information related to other one or more objects that may not be visible in the captured second view.

In accordance with an embodiment, the processor 202 may be operable to dynamically switch a mode of the UI 110 from a first mode to a second mode. In accordance with an embodiment, the processor 202 may be operable to switch a mode of the UI 110 based on a detection of another orientation of the electronic device 102. An example of a change in orientation may be a ninety degree rotation of the electronic device 102 from a horizontal orientation to a vertical orientation. In accordance with an embodiment, the processor 202 may be operable to switch the UI 110 from the first mode to the second mode based on a user input received from the user 112. The first mode and the second mode may correspond to, but are not limited to, an AR view mode, a character recognition mode, a barcode recognition mode, and/or detailed information display mode.

In accordance with an embodiment, the processor 202 may be operable to determine metadata of the one or more layers of information based on the dynamically switched mode of the UI 110. The processor 202 may be operable to modify the displayed composite view based on the determined metadata of the one or more layers of information. In accordance with an exemplary scenario, an exemplary information label may be present on the UI 110 displayed in the composite view. Subsequently, the electronic device 102 may be tilted up and down in succession. In such a case, the processor 202 may be operable to detect the change in orientation of the electronic device 102, via the sensing device 208. Subsequently, the processor 202 may be operable to determine metadata, such as expanded information label with additional information of the exemplary information label. The processor 202 may be operable to display the determined metadata in the modified composite view.

In accordance with another exemplary scenario, an object, such as a wine bottle, in a single field-of-view layer displayed at the UI 110. The orientation of the electronic device 102 may be a vertically upright orientation. The composite view displayed at the UI 110 may comprise only one layer of information, such as the field-of-view layer. The mode of the UI 110 is a first mode, such as a character recognition mode. Thus, the processor 202 may be operable to determine the name of the wine bottle. Subsequently, the orientation of the electronic device 102 may be changed to a horizontally upright orientation. The processor 202 may be operable to detect the change in orientation of the electronic device 102, via the sensing device 208. Subsequently, the processor 202 may be operable to switch the mode of the UI 110 from the first mode to a second mode, such as an AR view mode. The processor 202 may dynamically determine metadata, such as additional AR information of the exemplary object. The processor 202 may determine one or more layers of information, such as a field-of-view of the brewery manufacturing plant of the wine bottle, a map view layer that indicates the geographical location of the brewery manufacturing plant, an information label layer to display related information of other breweries and distances from the current location of the user 112, and a light beam layer to selectively highlight locations of the other breweries on the map view layer. The processor 202 may dynamically adjust the transparency and/or angle of each of the one or more layers of information and generate a modified composite view. The processor 202 may be operable to display the determined metadata in the modified composite view.

In accordance with an embodiment, the processor 202 may be operable to selectively share media content from the media content layer displayed at the display screen 108 with another electronic device (not shown). The media content may be selectively shared when the display screen 108 of the electronic device 102 is synchronized with another display screen (not shown) of the other electronic device. The media content may be selectively shared based on a selection, via a tapping operation, performed by the user 112 on the display screen 108. The media content may be displayed at the UI 110 in one of the formats, such as a matrix format, known in the art. The media content in the media content layer may be one or more of a live view captured by the image capturing unit 214 in real-time, pre-stored media content retrieved from the memory 204, and/or media content received from an external resource (not shown), such as a multimedia server or a television broadcast station.

Figure 3A:
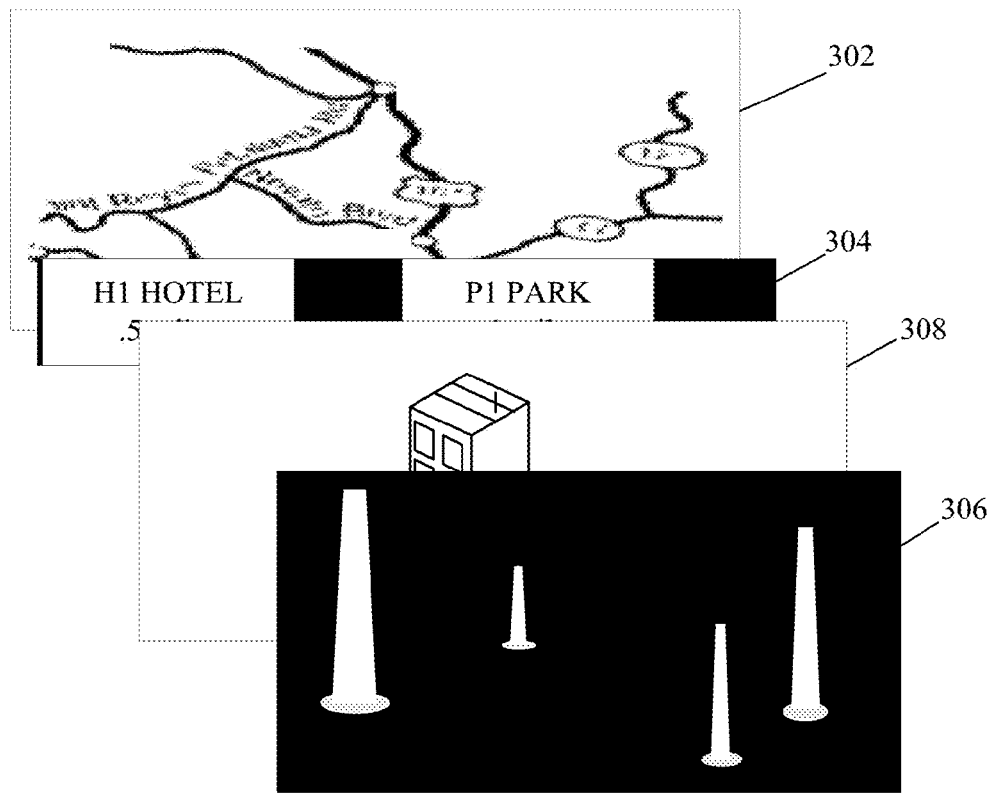
FIGS. 3A and 3B illustrate an exemplary implementation of the disclosed method and system to present information via a user interface, in accordance with an embodiment of the disclosure.
Figure 3B:
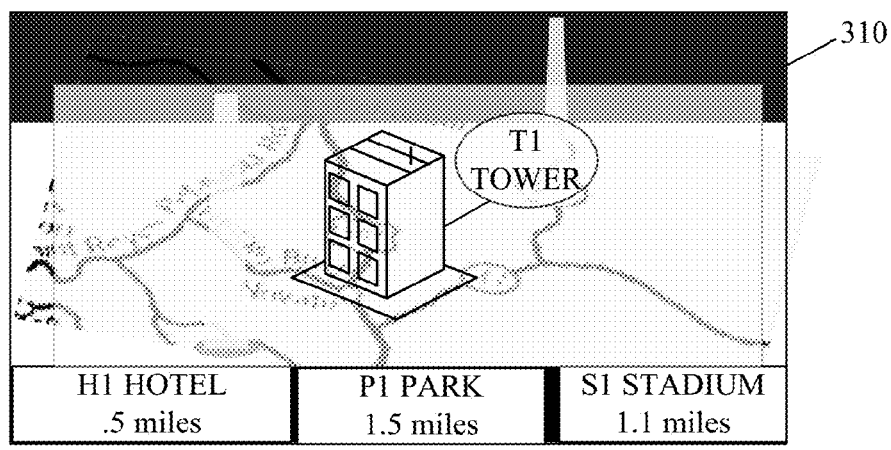

FIGS. 3A and 3B illustrate an exemplary implementation of the disclosed method and system to present information via the user interface, in accordance with an embodiment of the disclosure. FIGS. 3A and 3B is explained in conjunction with elements from FIG. 1 and FIG. 2. With reference to FIG. 3A, there are shown one or more layers of information, such as a map view layer 302, an information label layer 304, a light beam layer 306, a field-of-view layer 308 that comprises the first view captured by the electronic device 102. With reference to FIG. 3A, there is shown a composite view 310.

The map view layer 302 may refer to a street view that may comprise the location of the identified one or more objects. The street view may further comprise the location of other objects associated with the identified one or more objects. The information label layer 304 may comprise one or more information labels. The one or more information labels may comprise the first information related to the identified one or more objects in the first view. The one or more information labels may further comprise second information related to other objects associated with the identified one or more objects. The other objects may not be visible in the first view. The light beam layer 306 may be comprise one or more light beams that selectively highlights the one or more locations displayed at the street view of the map view layer 302. The light beams may be navigation beams that may aid in navigation from one location (one light beam) to another location (another light beam). The field-of-view layer 308 may comprise the first view captured by the electronic device 102. The view may correspond to a scene, live image data, and/or a video visible through or captured by the image capturing unit 214 of the electronic device 102. The composite view 310 may correspond to a dynamic layout that may be displayed at the UI 110. The composite view 310 may comprise the overlaid one or more layers of information.

With reference to FIG. 3A, the processor 202 may be operable to determine the map view layer 302, the information label layer 304, the light beam layer 306, and the field-of-view layer 308. The map view layer 302 may comprise a street view of the geographical location of the identified one or more objects, such as a tower "T1 TOWER". The information label layer 304 may comprise first information, such as "H1 HOTEL 0.5 miles" and "P1 PARK 1.5 miles", for a hotel and a park that may be visible in the first view. The information label layer 304 may comprise second information, such as "S1 STADIUM 1.1 miles", for a stadium that may not be visible in the first view. The light beam layer 306 may selectively highlight the one or more locations that may correspond to the first information and/or the second information. The light beams may further aid in navigation from one location (such as "H1 HOTEL 0.5 miles") to another location (such as "S1 STADIUM 1.1 miles"). The processor 202 may be operable to overlay the determined map view layer 302, the information label layer 304, the light beam layer 306, and the field-of-view layer 308 on the UI 110. The processor 202 may be further operable to detect an orientation of the electronic device 102. Based on the orientation, the processor 202 may be operable to dynamically adjust the transparency of each of the three overlaid layers of information, such that all the three layers may be simultaneously visible on the UI 110. For example, the processor 202 may adjust the transparency of the field-of-view layer to 40 percent, the map view layer to 50 percent, and the light beam layer to 50 percent.

With reference to FIG. 3B, based on the detected orientation of the electronic device 102, the processor 202 may dynamically generate the composite view 310 that may comprise the overlaid one or more layers of information. The one or more layers of information may include the map view layer 302, the information label layer 304, the light beam layer 306, and/or the field-of-view layer 308.

The processor 202 may be operable to dynamically adjust the transparencies of the overlaid one or more layers of information in the generated composite view 310. The processor 202 may be operable to display the generated composite view 310 on the UI 110 of the electronic device 102.

The UI 110 may further comprise one or more UI elements (not shown) that may receive input from one or more users, such as the user 112, associated with the electronic device 102. The one or more UI elements may provide one or more options for mode selection and/or context-based filter. In accordance with an embodiment, the processor 202 may be operable to select modes, such as the AR view mode, the character recognition mode, and/or the barcode recognition mode, via the one or more UI elements of the UI 110.

In accordance with an embodiment, the processor 202 may be operable to detect a change in the orientation of the electronic device 102, via the sensing device 208. The processor 202 may be operable to dynamically adjust an angle between the one or more determined layers of information in the composite view 310 displayed at the UI 110. Such an adjustment may be based on the detected changed orientation of the electronic device 102. The dynamic adjustment of the angle and/or the transparency may provide a usable, and easy-to-understand viewing experience to the user 112, via the UI 110.

Figure 4A:
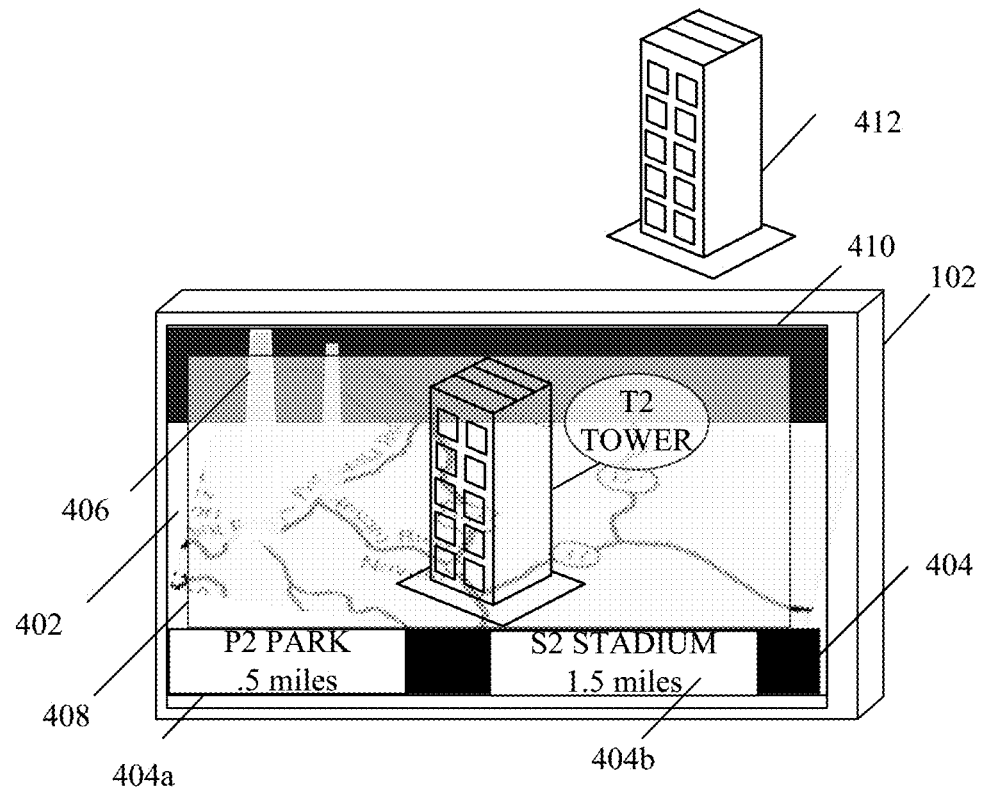
FIGS. 4A and 4B illustrate a first exemplary scenario for implementation of the disclosed method and system to present information via a user interface, in accordance with an embodiment of the disclosure.
Figure 4B:
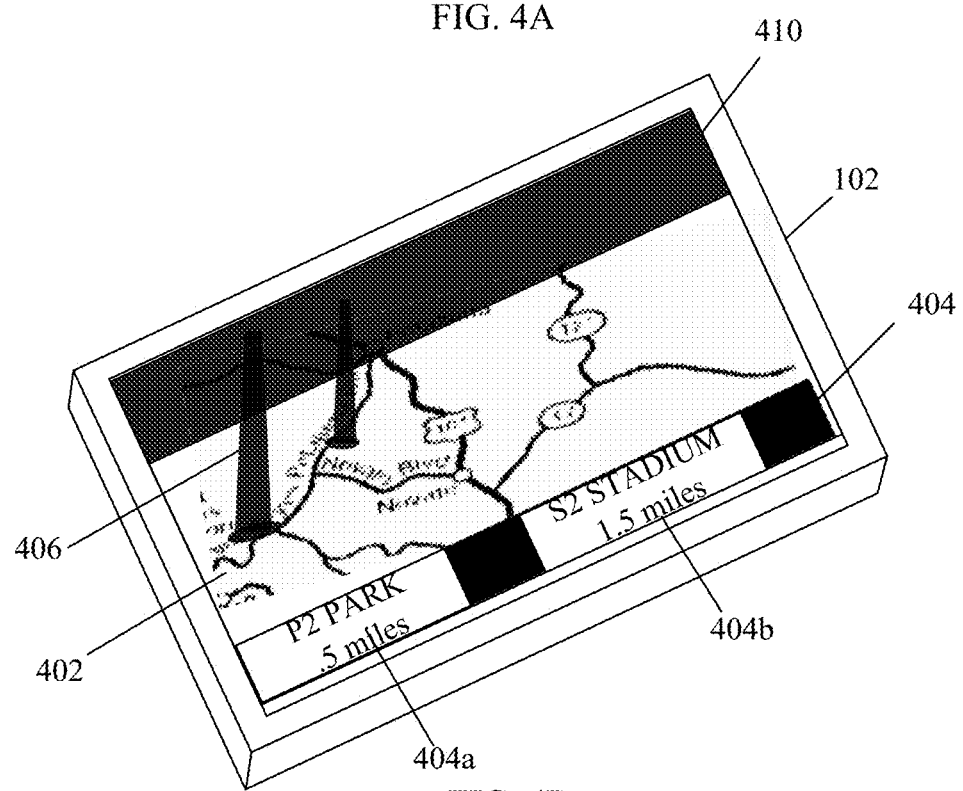

FIGS. 4A and 4B illustrate a first exemplary scenario for the implementation of the disclosed method and system to present information via a user interface (UI), in accordance with an embodiment of the disclosure. FIGS. 4A and 4B are explained in conjunction with elements from FIG. 1, FIG. 2, FIG. 3A, and FIG. 3B. With reference to FIGS. 4A and 4B, there is shown a schematic representation of a real-world object, such as the electronic device 102, the display screen 108, the UI 110, as shown in FIG. 1. There is further shown a map view layer 402, an information label layer 404, a light beam layer 406, a field-of-view layer 408, and a composite view 410. There is further shown a live video frame of a tower 412 in the field-of-view layer 408 visible on the UI 110. The live video may be captured by the electronic device 102, via the image capturing unit 214. The information label layer 404 may comprise one or more information labels 404a and 404b.

In accordance with the first exemplary scenario, the map view layer 402, the information label layer 404, and the light beam layer 406 may correspond to the map view layer 302, the information label layer 304, and the light beam layer 306, respectively. The field-of-view layer 408 that comprises the live video frame of the tower 412 may correspond to the field-of-view layer 308, as shown in FIG. 3A. The composite view 410 may correspond to the composite view 310, as shown in FIG. 3A.

With reference to FIG. 4A, a user, such as the user 112, may hold the electronic device 102 in a horizontally upright position (as shown). The user 112 may capture the first view, such as the live video of the tower 412 that may be visible on the UI 110. The processor 202 may be operable to dynamically generate and subsequently display the composite view 410 on the UI 110. The displayed composite view 410 may comprise the determined one or more layers of information, such as the map view layer 402, the information label layer 404, the light beam layer 406, and the field-of-view layer 408, that comprise the live video frame of the tower 412. The processor 202 may be operable to adjust the transparencies of the determined one or more layers of information based on the horizontally upright position of the electronic device 102.

The information label 404a may display the first information of the identified tower 412. Here, the first information may comprise distance information of the tower 412 from the electronic device 102. The first information may further comprise context-based information, such as a symbol that indicates the identified real-world object, a famous landmark, and/or point-of-interest (POI). Further, the first information may include name of a park, such as, "P2 PARK 0.5 miles". The information label 404b may display the second information on the information label layer 404. Here, the second information may be information about other objects, such as a nearby place "S2 STADIUM 1.5 miles", associated with the identified real-world object, such as the tower 412. The processor 202 may further determine metadata, such as AR information, "T2 TOWER", for the tower 412 displayed at the field-of-view layer 408. The information label layer 404 may further present AR information in addition to the information labels 404a and 404b.

With reference to FIG. 4B, the user 112 may then tilt-down the electronic device 102. In accordance with an embodiment, the processor 202 may be operable to detect the change in the orientation, such as a tilted orientation at an angle of 30 degrees, of the electronic device 102, via the sensing device 208. The processor 202 may be operable to dynamically adjust transparency of the overlaid one or more layers of information. Based on the changed orientation, the processor 202 may dynamically adjust the transparency of the field-of-view layer 408 from an initial 10 percent to a current 100 percent. Thus, the field-of-view layer 408 with live video frame may not be visible. The processor 202 may be further operable to dynamically adjust the transparency of the map view layer 402 from an initial 30 percent to a current 85 percent. The processor 202 may be further operable to adjust the transparency of the light beam layer 406 from an initial 30 percent to a current 15 percent in the tilted orientation.

The one or more light beams of the light beam layer 406 may selectively highlight one or more locations displayed at the map view layer 402. The one or more locations may correspond to the second information provided in the information labels 404a and 404b. The user 112 may use the one or more light beams and the displayed information labels 404a and 404b to decide whether to visit next object, or not. Further, the user 112 may visualize a navigation route by a single tap on the destination object, via the UI 110, as indicated by one of the light beams.

In accordance with an embodiment, the processor 202 may be further operable to simultaneously arrange the one or more layers of information in the composite view 410 at an angle with respect to a reference axis. The reference axis may be parallel to the display screen 108. For example, with reference to FIG. 4A, the field-of-view layer 408 and the light beam layer 406 may be arranged at an angle of zero degrees with respect to the reference axis. The map view layer may be arranged at an angle of 45 degrees with respect to the reference axis. With reference to FIG. 4B, the angle between the map view layer 402 and the field-of-view layer 408 may be arranged at 90 degree with respect to each other. The arranged map view layer 402 and the field-of-view layer 408 may be further arranged at zero degree with reference to the reference axis. Such adjustments of the transparency and/or the angle may occur based on the detected tilt orientation of the electronic device 102.

Figure 5:
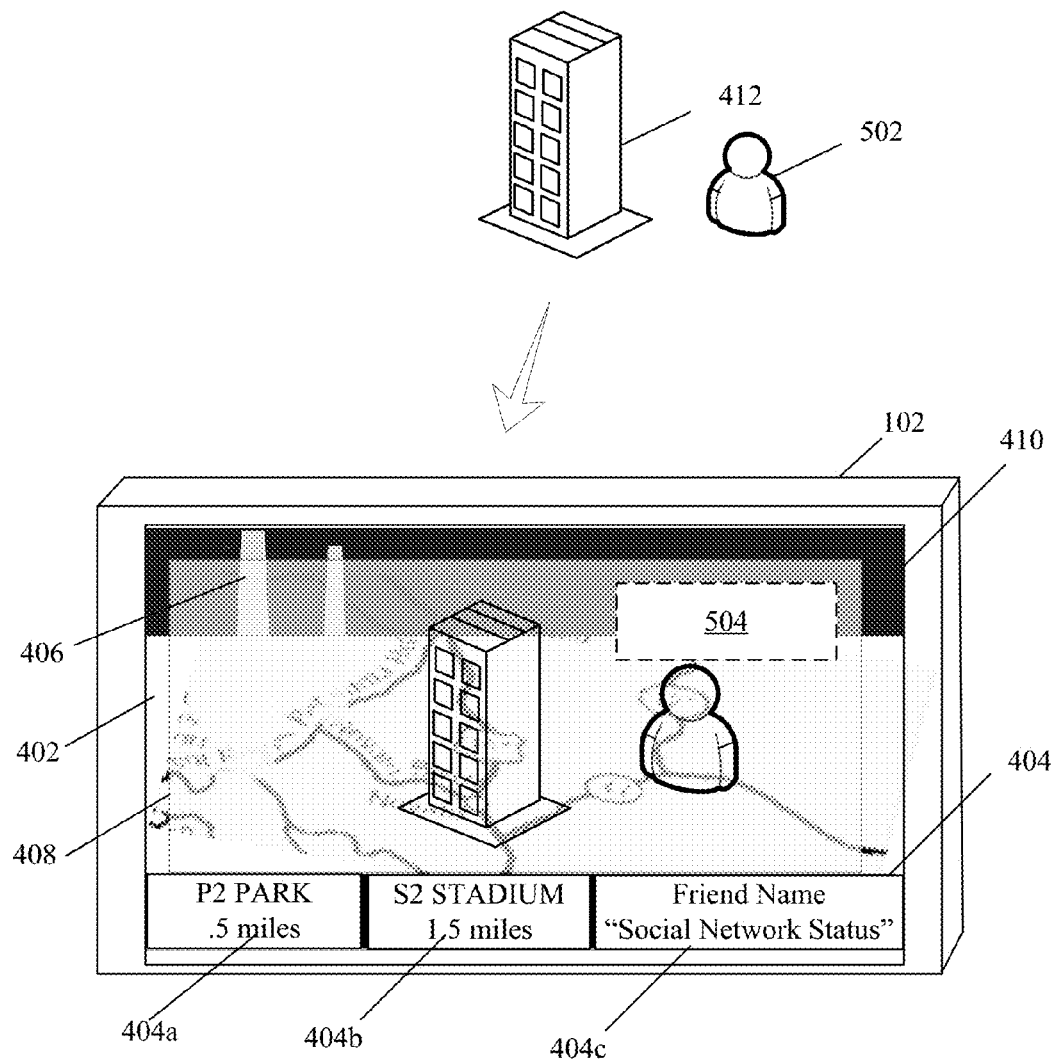
FIG. 5 illustrates a second exemplary scenario for implementation of the disclosed method and system to present information via a user interface, in accordance with an embodiment of the disclosure.

FIG. 5 illustrates a second exemplary scenario for the implementation of the disclosed method and system to present information via a user interface, in accordance with an embodiment of the disclosure. FIG. 5 is explained in conjunction with elements from FIG. 1, FIG. 2, FIG. 3A, FIG. 3B, FIG. 4A, and FIG. 4B. With reference to FIG. 5, there is shown a schematic representation of another user 502 that may stand near the tower 412, in accordance with the operation sequence of the first exemplary scenario of FIGS. 4A and 4B.

In accordance with the second exemplary scenario, the other user 502 may appear in the live video frame captured by the image capturing unit 214. The other user 502 may be in a friend list of the user 112 registered with a social networking site. The other user 502 may be in a contact list of an address book service of the electronic device 102 (such as a smartphone).

In operation, the processor 202 may be operable to identify the second object, such as the other user 502, in the live video frame captured by the image capturing unit 214 of the electronic device 102. The processor 202 may be operable to dynamically update the overlaid one or more layers of information in the composite view 410. The overlaid one or more layers of information may be dynamically updated based on the one or more functional services, such as the user profile information, the address book service, and/or the social network.

A new information label 404c in the information label layer 404 may be determined and subsequently displayed at the UI 110. The information label 404c may further display the first information that corresponds to the identified other user 502, such as, "<Friend Name>" and/or the last updated social network status information, such as, "<Social Network Status>: Hey friends! Do visit this wonderful tower". The updated one or more information labels 404a, 404b, and 404c, may be displayed at the information label layer 404. In accordance with an embodiment, one or more information labels, such as the information label 404, may be displayed in proximity of the identified object, such as the other user 502. Thus, as the field-of-view captured by the electronic device 102 changes, the processor 202 may be operable to dynamically, continuously, and expediently modify the composite view 410. As a consequence, the UI 110 of the electronic device 102 may be a sensor-rich UI that responds to the sensing device 208. The UI 110 may provide an enhanced and/or eloquent viewing experience to the user 112.

Figure 6:
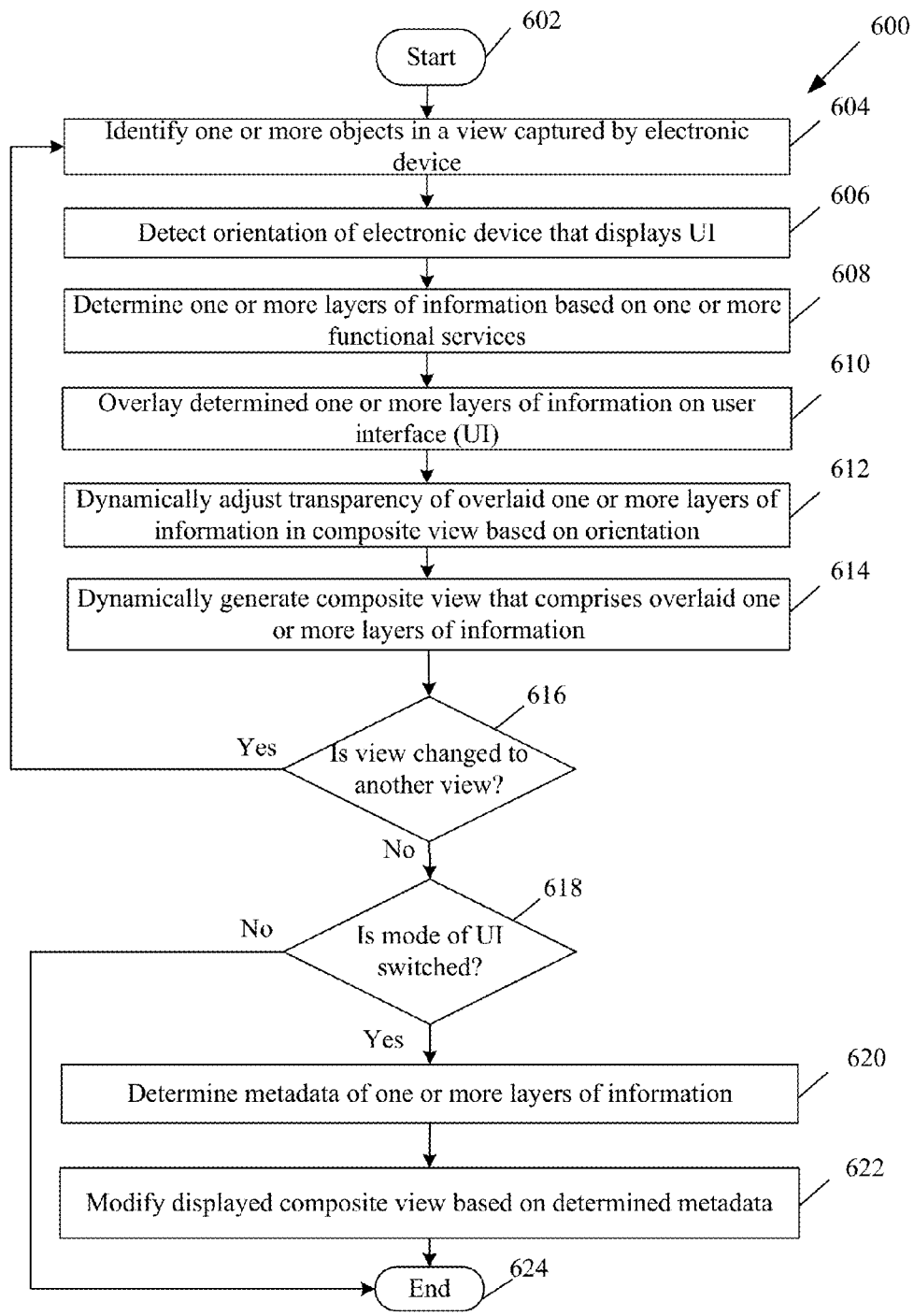
FIG. 6 is a flow chart that illustrates an exemplary method to present information via a user interface, in accordance with an embodiment of the disclosure.

FIG. 6 is a flow chart illustrating an exemplary method to present information via a user interface, in accordance with an embodiment of the disclosure. With reference to FIG. 6, there is shown a flow chart 600. The flow chart 600 is described in conjunction with FIGS. 1 and 2. The method starts at step 602 and proceeds to step 604.

At step 604, one or more objects may be identified in a view, such as the first view, captured by the electronic device 102. At step 606, an orientation of the electronic device 102, which displays the UI 110, may be detected. At step 608, one or more layers of information may be determined based on one or more functional services. At step 610, the determined one or more layers of information may be overlaid. At step 612, transparencies of each of the overlaid one or more layers of information in the composite view may be dynamically adjusted. Such an adjustment may be based on the detected orientation of the electronic device 102. In accordance with an embodiment, an angle between the one or more layers of information may be adjusted in parallel to the adjustment of the transparency. In accordance with an embodiment, such an adjustment may occur subsequent to the adjustment of the transparency. At step 614, the composite view with dynamically adjusted transparencies of the overlaid one or more layers of information may be displayed. At step 616, it may be determined whether the first view changed to a second view. In instances when the first view is changed to the second view, the control passes back to step 604. In instances when the first view is not changed to the second view, the control passes to step 618.

At step 618, it may be determined whether the mode of the UI 110 is switched from the first mode to a second mode. In an instance, the mode of the UI 110 may not be switched. Control passes to end step 626. In an instance, the UI 110 may be switched from the first mode to the second mode based on a manual selection of a UI element, such as a software button, provided by the user 112. In accordance with another embodiment, the UI 110 may be switched from the first mode to the second mode when the electronic device 102 is detected in another orientation, such as a rotation orientation. Control passes to step 620. At step 620, metadata of the one or more layers of information may be determined. Such a determination may occur based on a user input via the UI 110, or based on a detection of an orientation change of the electronic device 102. At step 622, the composite view may be modified based on the determined metadata of the one or more layers of information. At step 624, the modified composite view may be displayed. Control passes to end step 626.

In accordance with an embodiment of the disclosure, a system to present information is disclosed. The electronic device 102 may comprise one or more processors (hereinafter referred to as the processor 202 (FIG. 2)). The processor 202 may be operable to detect an orientation of the electronic device 102 that overlays one or more layers of information on the UI 110, displayed at the electronic device 102. The processor 202 may be operable to dynamically adjust the transparency of the overlaid one or more layers of information, based on the detected orientation of the electronic device 102.

Various embodiments of the disclosure may provide a non-transitory computer readable medium and/or storage medium, and/or a non-transitory machine readable medium and/or storage medium having stored thereon, a machine code and/or a computer program having at least one code section executable by a machine and/or a computer to present information. The at least one code section in the electronic device 102 may cause the machine and/or computer to perform the steps comprising detection of an orientation of the electronic device 102. One or more layers of information may be overlaid on the UI 110 displayed at the electronic device 102. Transparency of the overlaid one or more layers of information may be dynamically adjusted based on the detected orientation of the electronic device 102.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for presenting information, comprising:
in an electronic device:
detecting an orientation of said electronic device;
overlaying at least three layers of information on a user interface (UI) displayed at said electronic device;
dynamically adjusting transparency of said overlaid at least three layers of information based on said detected orientation of said electronic device;
identifying at least one first real object in a first view captured by said electronic device;
determining said overlaid at least three layers of information based on at least one functional service,
wherein said at least one functional service corresponds to at least one of a map service, a social network, an address book service, or a user profile information, and
wherein said overlaid at least three layers of information comprise at least one of a map view layer, an information label layer, a light beam layer, a field-of-view layer, or a media content layer; and
wherein said light beam layer is a top layer, said field-of-view layer is a middle layer and said map view layer is a bottom layer of said overlaid at least three layers of information.

2. The method as claimed in claim 1, wherein said overlaid at least three layers of information further correspond to at least one of a first information related to a second real object associated with said identified at least one first real object or a second information related to said identified at least one first real object in said first view, and wherein said second real object is out of said first view.

3. The method as claimed in claim 1, further comprising dynamically updating said overlaid at least three layers of information based on a second view that is captured by said electronic device.

4. The method as claimed in claim 1, further comprising dynamically generating a composite view comprising said overlaid at least three layers of information with said dynamically adjusted said transparency of each of said overlaid at least three layers of information.

5. The method as claimed in claim 4, further comprising displaying said composite view on said UI such that said overlaid at least three layers of information in said displayed composite view are synchronized with respect to each other.

6. The method as claimed in claim 5, further comprising dynamically switching said UI of said displayed composite view from a first mode to a second mode.

7. The method as claimed in claim 6, wherein said first mode and said second mode corresponds to one of
an augmented reality (AR) view mode, a character recognition mode, a barcode recognition mode, or detailed information display mode.

8. The method as claimed in claim 6, wherein said dynamic switching of said UI from said first mode to said second mode is based on one of
a detection of a different orientation of said electronic device or a user input received via said UI.

9. The method as claimed in claim 6, further comprising determining metadata of said overlaid at least three layers of information based on said dynamic switching of said UI from said first mode to said second mode.

10. The method as claimed in claim 9, further comprising modifying said displayed composite view based on said determined metadata of said at least three layers of information.

11. The method as claimed in claim 1, wherein said light beam layer comprises at least one light beam selectively highlighting at least one location displayed at said map view layer.

12. The method as claimed in claim 1, further comprising selective sharing of media content from said media content layer displayed at a display screen of said electronic device based on said display screen that is synchronized with a different display screen of a different electronic device.

13. The method as claimed in claim 1, further comprising arranging said overlaid at least three layers of information at an angle with respect to a reference axis, wherein said arrangement is based on said detected orientation of said electronic device.

14. The method as claimed in claim 1, further comprising dynamically adjusting transparency of the top layer, the middle layer and the bottom layer such that the top layer, the middle layer and the bottom layer are visible concurrently.

15. A system for presenting information, comprising:
one or more processors in an electronic device, wherein said one or more processors are operable to:
detect an orientation of said electronic device;
overlay at least three layers of information on a user interface (UI) displayed at said electronic device;
dynamically adjust transparency of said overlaid at least three layers of information based on said detected orientation of said electronic device;
identify at least one first real object in a first view captured by said electronic device; and
determine said overlaid at least three layers of information based on at least one functional service,
wherein said at least one functional service corresponds to at least one of a map service, a social network, an address book service, or a user profile information, and
wherein said overlaid at least three layers of information comprises at least one of a map view layer, an information label layer, a light beam layer, a field-of-view layer, or a media content layer; and
wherein said light beam layer is a top layer, said field-of-view layer is a middle layer and said map view layer is a bottom layer of said overlaid at least three layers of information.

16. The system as claimed in claim 15, wherein said one or more processors are further operable to dynamically update said overlaid at least three layers of information based on a second view that is captured by said electronic device.

17. The system as claimed in claim 15, wherein said one or more processors are further operable to dynamically generate a composite view comprising said overlaid at least three layers of information.

* * * * *